US007356015B2

(12) United States Patent
Ibe et al.

(10) Patent No.: US 7,356,015 B2
(45) Date of Patent: Apr. 8, 2008

(54) DATA HANDOFF METHOD BETWEEN WIRELESS LOCAL AREA NETWORK AND WIRELESS WIDE AREA NETWORK

(75) Inventors: Oliver C. Ibe, Andover, MA (US); Steven Blumenthal, 17 Moon Hill Rd., Lexington, MA (US) 02421-6112

(73) Assignee: Steven Blumenthal, Lexington, MA (US)

( * ) Notice: Subject to any disclaimer, the term of this patent is extended or adjusted under 35 U.S.C. 154(b) by 735 days.

(21) Appl. No.: 10/836,057

(22) Filed: Apr. 30, 2004

(65) Prior Publication Data
US 2004/0218575 A1 Nov. 4, 2004

Related U.S. Application Data

(60) Provisional application No. 60/467,822, filed on May 2, 2003, provisional application No. 60/467,430, filed on May 2, 2003.

(51) Int. Cl.
*H04Q 7/24* (2006.01)
*H04Q 7/20* (2006.01)
*H04M 1/66* (2006.01)

(52) U.S. Cl. ................... 370/338; 455/411; 455/445

(58) Field of Classification Search ............... 455/445, 455/426.1, 435, 411
See application file for complete search history.

(56) References Cited

U.S. PATENT DOCUMENTS

2003/0134638 A1* 7/2003 Sundar et al. ............ 455/435
2004/0203800 A1* 10/2004 Myhre et al. ............ 455/445

* cited by examiner

*Primary Examiner*—Joseph Feild
*Assistant Examiner*—Kiet Doan
(74) *Attorney, Agent, or Firm*—Houston Eliseeva LLP

(57) ABSTRACT

A method and associated system enables seamless data roaming and handoff between the wireless local area network (WLAN) and the wireless wide-area network (WWAN). This method enables a mobile device to originate a data connection in the WLAN and have this data connection be automatically handed off to the WWAN without losing the connection when the user goes outside the range of the WLAN. Similarly, it enables a mobile device to originate a data connection in the WWAN and have this data connection be automatically handed off to the WLAN without losing the connection when the user loses the signal of the WWAN. This solution assumes that the user has subscribed to data services from a cellular carrier that will authenticate the user before permitting the handoff.

12 Claims, 4 Drawing Sheets

DATA HANDOFF METHOD BETWEEN WIRELESS LOCAL AREA NETWORK AND WIRELESS WIDE AREA NETWORK

RELATED APPLICATIONS

This application is claims the benefit of the filing date of Provisional Appl. Nos. 60/467,430 and 60/467,822, filed on May 5, 2003, under 35 U.S.C. 119(e), both of which applications are incorporated herein by this reference in their entirety.

This application relates to U.S. patent application Ser. No. 10/836,056 filed Apr. 30, 2004, by the same inventors, entitled Authentication of Mobile Devices Via Proxy Device, which is incorporated herein in its entirety by this reference.

BACKGROUND OF THE INVENTION

The telecommunications industry is experiencing a remarkable growth in cellular mobile telephony as well as Internet use. One of the results of this growth is the increasing use of cellular wireless data services. Thus, the need to support mobility is no longer limited to voice service but also extends to data service.

Within the enterprise there is a growing use of wireless local area networks (WLANs). Currently WLANs are primarily used for data, even though voice can also be supported. A major effort is under way to provide seamless roaming between the cellular data network and the WLAN. This will permit data applications, such as a Transmission Control Protocol (TCP) based downloads or User Datagram Protocol (UDP) based streaming video, that originate when the user is using his/her laptop or mobile device in the WLAN to continue uninterrupted when the user moves outside the limits of the WLAN into the cellular data network, such as the General Packet Radio Service (GPRS) network. Similarly, it will enable a connection that originates in a cellular data network, which is hereafter referred to as a wireless wide area network (WWAN), to continue uninterrupted in a WLAN when the user roams into a building with poor or no WWAN signal reception.

Some current data handoff schemes are based on Mobile IP, which works through the following three elements:

Mobile Node, which is a node that has a permanent IP address registered in its "home" network. The node can change its point of attachment to the Internet while being reachable through the same IP address.

Home Agent, which is router that serves the mobile nodes in a given subnet. When a Mobile Node connects to a foreign network, which is any network that is not its home network, it registers its care-of address (COA) with the Home Agent. The Home Agent uses the COA to forward packets arriving at the home network and destined for the Mobile Node to the node. This packet forwarding is done via a technique called tunneling.

Foreign Agent, which is a router in the visited (or foreign) network whose IP address the Mobile Node uses as its COA. The tunnel from the Home Agent terminates at the Foreign Agent, and it is the responsibility of the Foreign Agent to forward packets arriving via the tunnel to the Mobile Node.

These three elements interact through the following three processes:

Agent discovery is the process by which the Foreign Agent advertises its availability on its network to the roaming Mobile Nodes. A Foreign Agent periodically broadcasts the agent discovery message, which enables the Mobile Nodes to obtain their COA. If a Mobile Node does not receive the agent discovery message within some predefined time interval after it has connected to the subnet, it broadcasts an agent solicitation message that asks the available Foreign Agents in the subnet to identify themselves to the Mobile Node.

Registration, which is the process by which a Mobile Node in a foreign network requests service from the Foreign Agent and registers its COA with the Home Agent.

Routing, which is the process by which packets are routed to and from a Mobile Node in a foreign network.

Mobile IP is defined in the Internet Engineering Task Force (IETF) RFC 2002 for IPv4 and updated in RFC 3344. Mobile IP for IPv6 is currently in the draft stage. Mobile IP permits a Mobile Node to roam from one network to another and still be able to maintain connectivity with the home network. However, this requires the node to physically connect to the visited network first before it can communicate with the home network. Thus, it does not necessarily provide a fast and seamless handoff between the current network and the next network to be visited. This means that a Mobile Node may experience data loss and delay that can be detrimental to real-time multimedia applications that use reliable transport protocols.

Also, Mobile IPv4, which is currently used in most networks, is based on the idea that a Mobile Node has a permanent IP address through which it can be reached anywhere in the world. However, with the shortage of IPv4 addresses and the prevalent use of private (or non-routable) IP addresses and network address translation (NAT), most networks cannot support Mobile IP in a clean way.

One scheme that is being developed within IETF to address the limitation of requiring a Mobile Node to have a permanent IP address is the Diameter protocol. The protocol permits a Mobile Node to use its network access identifier (NAI), which is the user ID submitted by a Point-to-Point Protocol (PPP) client (such as a laptop) during PPP authentication. Diameter extensions for Mobile IPv4 have been proposed to allow a MIPv4 node to receive services from service providers (home and foreign) and allowing the Diameter servers to authenticate, authorize and collect accounting information for those MIPv4 nodes. Similarly, Diameter extensions to Mobile IPv6 have been proposed since the architecture of Mobile IPv4 is slightly different from that of Mobile IPv4. However, while the Diameter protocol may resolve the issue of static IP address assignment, it does not support dynamic data handoff in the sense that a Mobile Node cannot transfer a connection created in one network to another network.

Another set of protocols that have been proposed deals with TCP over heterogeneous networks (ToHN). The goal of these protocols is to improve the performance of the TCP connections over wireless links. However, these protocols, which include indirect TCP, are fixed protocols that assume that the TCP server and the TCP client are in wired and wireless networks respectively, or vice versa. They do not deal with dynamic handoff when the client moves from one network to another.

SUMMARY OF THE INVENTION

The present invention addresses the problem of dynamic connection establishment associated with handoffs. Moreover, it can be implemented on top of the ToHN protocols to deal with the mobility of the TCP client between different wireless networks.

In a general aspect, the invention features a method and associated system that enables seamless data roaming and handoff between the WLAN and the WWAN. This method enables a mobile device to originate a data connection in the WLAN and have this data connection be automatically handed off to the WWAN without losing the connection when the user goes outside the range of the WLAN. Similarly, it enables a mobile device to originate a data connection in the WWAN and have this data connection be automatically handed off to the WLAN without losing the connection when the user loses the signal of the WWAN. This solution assumes that the user has subscribed to data services from a cellular carrier that will authenticate the user before permitting the handoff.

In one aspect, in general, the invention features a method for communicating with a mobile terminal in which a fixed radio terminal emulates the mobile terminal on a wide area wireless network. The method can include establishing a first communication path passing from the wide area wireless network through the fixed radio terminal over a local network to the mobile terminal.

In another aspect, in general, the invention features a method for handing off a communication session with a mobile terminal between a local network and a wide area wireless network. The method includes switching the communication session between a communication path passing from the wide area wireless network through a fixed radio terminal and over the local network to the mobile terminal and a communication path passing from a device on the local network to the mobile terminal not passing through fixed radio terminal. The method also includes switching the communication session between the communication path passing from the wide area wireless network through a fixed radio terminal and a communication path passing from the wide area wireless network directly to the mobile terminal without passing through the fixed radio terminal.

Aspects of the invention may provide one or more of the following advantages:

Data loss and delay associated with Mobile IP handoffs are avoided. This makes the approach particularly useful for TCP-based or UDP-based applications.

Addressing limitations associated with private IP addresses and network address translation are supported.

The approach does not necessarily depend on any particular addressing scheme used. It works well for both networks that assign public IP addresses to their nodes and those that assign private IP addresses to their nodes. It performs dynamic data handoff and does not require changes in the carrier's network architecture. In particular, it is an enterprise solution that does not require any changes in the carrier's network operation. In fact, it is transparent to the carrier's network.

The approach provides a mechanism seamlessly hand over a TCP-based data connection from a WLAN to a WWAN (or carrier cellular data network) and from a WWAN to a WLAN The approach supports data roaming that is not based on Mobile IP, and therefore does not necessarily assume that the mobile device has a permanent IP address with which it can be reached anywhere.

Data handoff service can be accomplished in a loosely coupled manner without requiring a tight integration with the carrier network.

The service is transparent to the cellular data network.

The approach to TCP connection bridging can prevent rate mismatch over different networks.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

While this invention has been particularly shown and described with references to preferred embodiments thereof, it will be understood by those skilled in the art that various changes in form and details may be made therein without departing from the scope of the invention encompassed by the appended claims.

FIG. 3 illustrates the message flow diagram of the handoff procedure from the WLAN to the WWAN, according to the present invention; and.

DETAILED DESCRIPTION OF THE PREFERRED EMBODIMENTS

Provisional patent application Ser. No. 60/419,674 titled "Method of Seamless Roaming Between Wi-Fi Network and Cellular Network" and U.S. patent application Ser. No. 10/668,608, filed Oct. 17, 2003, entitled "Method of Seamless Roaming Between Wireless Local Area Networks and Cellular Carrier Networks", which are incorporated herein in their entirely by this reference, describe a Cellular Controller device that connects the 802.11 wireless local area network to the cellular carrier's network.

The Cellular Controller permits mobile devices to operate inside a building or some other defined area that has 802.11 WLAN coverage in the 802.11 WLAN mode and to be present on the cellular carrier's network via a radio proxy for that mobile device. The radio proxy of the device that exists in the Cellular Controller behaves to the cellular carrier's network exactly as the device would behave if the real one were connected to the carrier's network.

In a baseline network of a type described in the provisional patent application titled "Method of Seamless Roaming Between Wi-Fi Network and Cellular Network," when a subscriber with a dual mode mobile device is in a building controlled by the Cellular Controller, the device's default operation will be the 802.11 mode and therefore the cellular radio of the mobile device will be turned off. The Cellular Controller creates a proxy for the user's mobile device in the cellular carrier's network. This proxy authenticates the user on the cellular carrier's network and then sends and receives calls and data messages to and from the cellular carrier's network on behalf of the user. The Cellular Controller works with the Control Server in the enterprise's LAN to locate the user in the building and to determine which 802.11 Access Point is serving the user.

When the Cellular Controller receives a voice call from the cellular carrier network that is destined for a mobile device it is proxying for, it uses the Session Initiation Protocol (SIP)-based voice over IP (VoIP) to forward the call via the corporate LAN to the mobile device. Similarly, voice and data messages that originate at the mobile device operating in 802.11 WLAN mode use SIP to set up a call to the Cellular Controller, if it is intended to be transmitted out of the building over the cellular carrier's network. The device then uses VoIP over WLAN to transmit the voice packets over the wireless LAN infrastructure where it is received by the Access Point and forwarded to the Cellular Controller over the wired LAN infrastructure. The Cellular Controller converts the packet into the right format for transmission over the cellular network.

Figure 1:
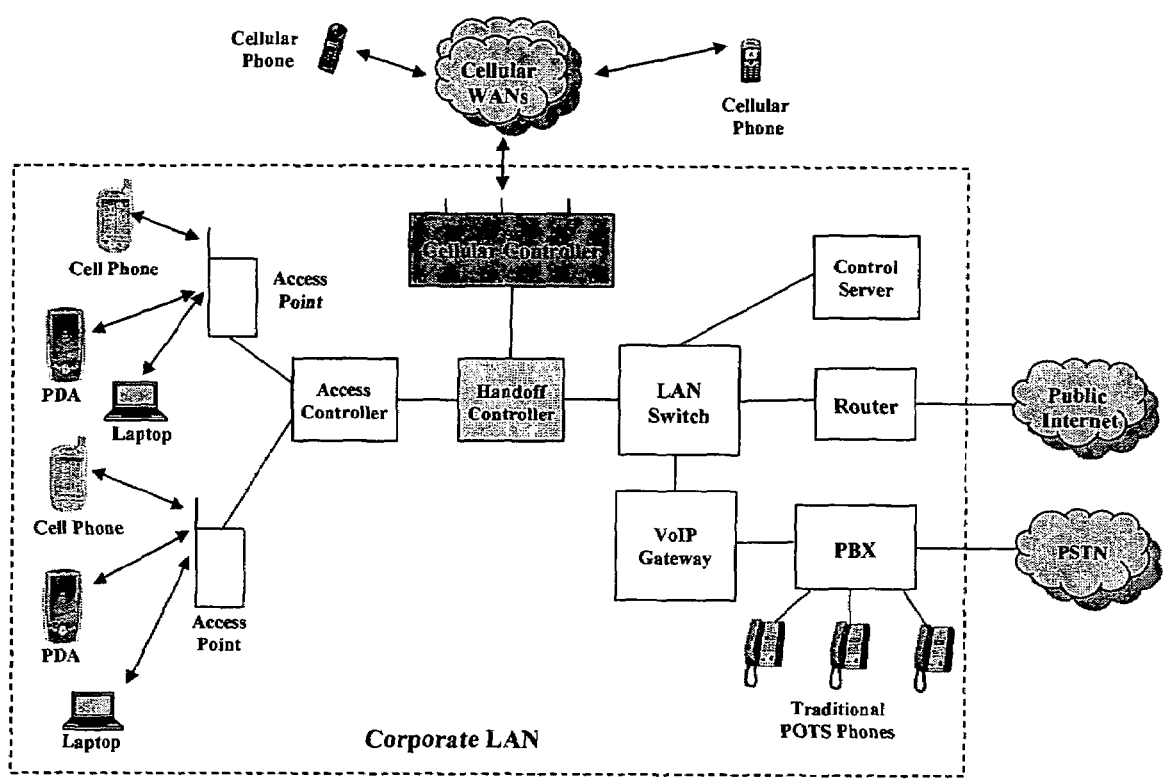
FIG. 1 is a block diagram showing of an architecture of an exemplary network, according to the present invention.

The architecture of the baseline network is shown in FIG. 1. Different types of mobile devices are shown in the figure. These include laptops equipped with wireless network interface cards, personal digital assistants (PDAs) and cell phones.

The following description pertains to seamless roaming for the data users, the description of the scheme is limited to the operation of data devices, particularly the laptops, tablet PCs and personal digital assistants (PDAs) or other IP capable mobile devices. In the remainder of this description we assume that the device is a laptop. However, the principles discussed here are applicable to the any other mobile data device.

The default network is the WLAN. Therefore, when a laptop is turned on in the building, it sends a Registration Request message to an authentication server in the wired LAN called the Control Server via the Access Controller. The Control Server authenticates the device using whatever authentication scheme applies in the corporate network. For example, if the corporate network uses the IEEE 802.1X scheme, then the Access Controller is the authenticator that relays authentication requests from the devices to the authentication server (i.e., Control Server) in the wired network. The authentication process is typically carried out according to standard protocols and approaches. After the laptop has been successfully authenticated, it obtains its IP address through a DHCP server.

Figure 2:
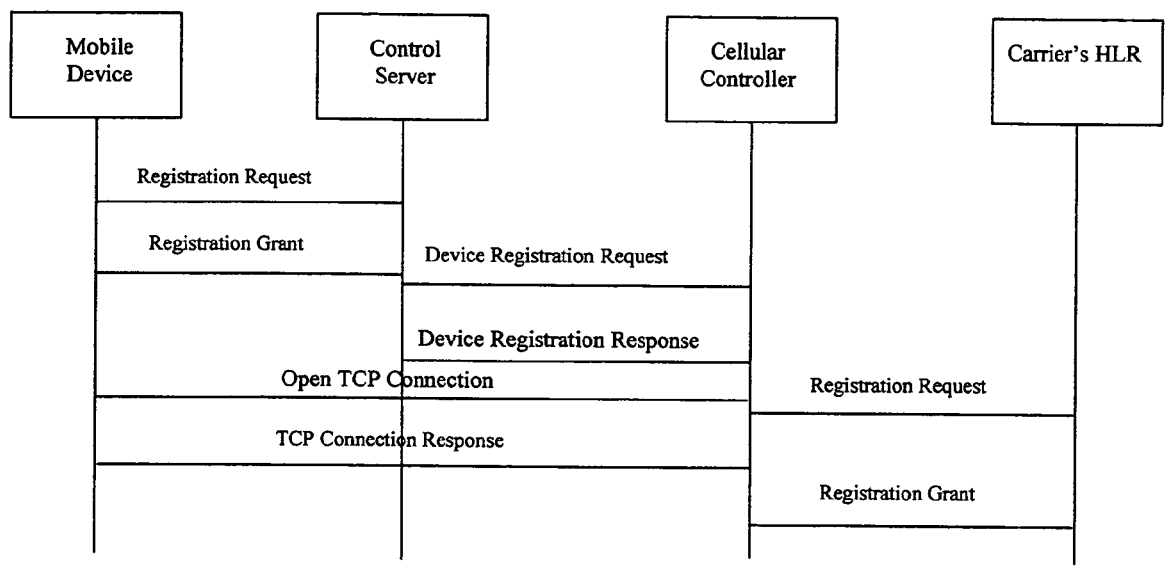
FIG. 2 is a diagram that illustrates the message flow diagram of the registration process, according to the present invention.

The Control Server maintains the WWAN service profile of all enterprise WLAN devices. This profile includes carrier network, a device's assigned IP address (in those cases where static IP addresses are assigned to network devices), and the device's Medium Access Control (MAC) address (that may be used to authenticate the device in the carrier's network). After the Control Server has authenticated the laptop, it instructs the Cellular Controller to create a proxy function for the device in the user's wireless Internet service provider's network using the relevant information in the device's service profile. The Cellular Controller creates a TCP connection to the device and uses the information received from the Control Server to register the device in the service provider's network home location register (HLR) and proxy for it in that network. That is, the Cellular Controller listens on the network for data (e.g. web pages) destined for the device and passes any such data to the device over the TCP connection. FIG. 2 illustrates the message flow diagram of the registration process in both the WLAN and WWAN. The messages in the diagram represent actions rather than the exact messages exchanged.

Consider the case where the laptop originates a TCP connection to download some data while it is in the WLAN. If the download completes while the laptop is in the WLAN, the TCP connection is closed. However, if the user decides to move with the laptop while the TCP connection over which the data are being downloaded is still open, the connection will be lost when the user moves outside the limits of the WLAN. In order not to forcibly terminate the download or close the connection, the laptop is handed over to the WWAN, if the user has a subscription to the services provided by the WWAN operator. Similarly, if the laptop was downloading data using TCP while it was in the WWAN and the user roams into a building with poor cellular coverage but good WLAN coverage, the connection will be handed over to the WLAN through the Cellular Controller. The remainder of this description deals with how this handoff between the WLAN and WWAN and vice versa is performed under the assumption that the user has subscribed for a WWAN service from a wireless Internet service provider.

The handoff is a mobile device-initiated handoff in which the mobile device (or laptop in this example) continuously measures the signal strength while it is in the WLAN to determine when it needs to be handed over to the WWAN. When the received signal strength indicator falls below a predefined threshold, the mobile device initiates the handoff process.

To initiate the handoff from the WLAN to the WWAN, the mobile device sends an "initiate handoff" message to the Cellular Controller via Handoff Controller when the received signal strength indicator goes below a predefined threshold. Included in this message are the parameters of the current TCP connection: its port number, window size, and its IP address in the WLAN.

When the Cellular Controller receives the message from the Handoff Controller, it initiates TCP connection to the mobile device via the WWAN on which it has a subscription. The WWAN will initiate transmission of a page for the device. Since the device is still logged to the WLAN, it does not receive the page directly. However, since the Cellular Controller is proxying for the device, it receives the page on its behalf and passes it on to the device over the local TCP connection. The device responds to the page via the Cellular Controller over the local TCP connection.

After the device has received information on the WWAN connection parameters for the connection, the device will send a message to the Handoff Controller to assume ownership of its end of both the local TCP connection to the Cellular Controller and the TCP connection over which the download is taking place. Then the device will switch over to the assigned WWAN channel and send a Short Message Service (SMS) message to the Cellular Controller indicating that it is ready to receive data over the new connection. Meanwhile, the Handoff Controller bridges the two TCP connections and temporarily buffers all packets arriving from the download TCP. It will thereafter redirect all packets arriving over the download TCP connection to the local TCP connection when requested by the Cellular Controller. On receiving the SMS message, the Cellular Controller asks the Handoff Controller to start sending it the buffered data destined for the mobile device and any newly arrived packets. The data are now forwarded to the device over the WWAN via the new TCP connection. Thus, the mobile device resumes the connection without interruption.

The request from the device to the Handoff Controller to assume ownership of the TCP connection includes the details of the connection, which include the IP address, TCP port address, and window size as well as the window size of the new WWAN TCP connection. After receiving this request the Handoff Controller sends a message to the peer process at the other end of the TCP connection to adjust the window size according to the new value the WWAN can support. In this way the window sizes of the two TCP connections are made as close to each other as possible to avoid any rate mismatch.

Figure 3:
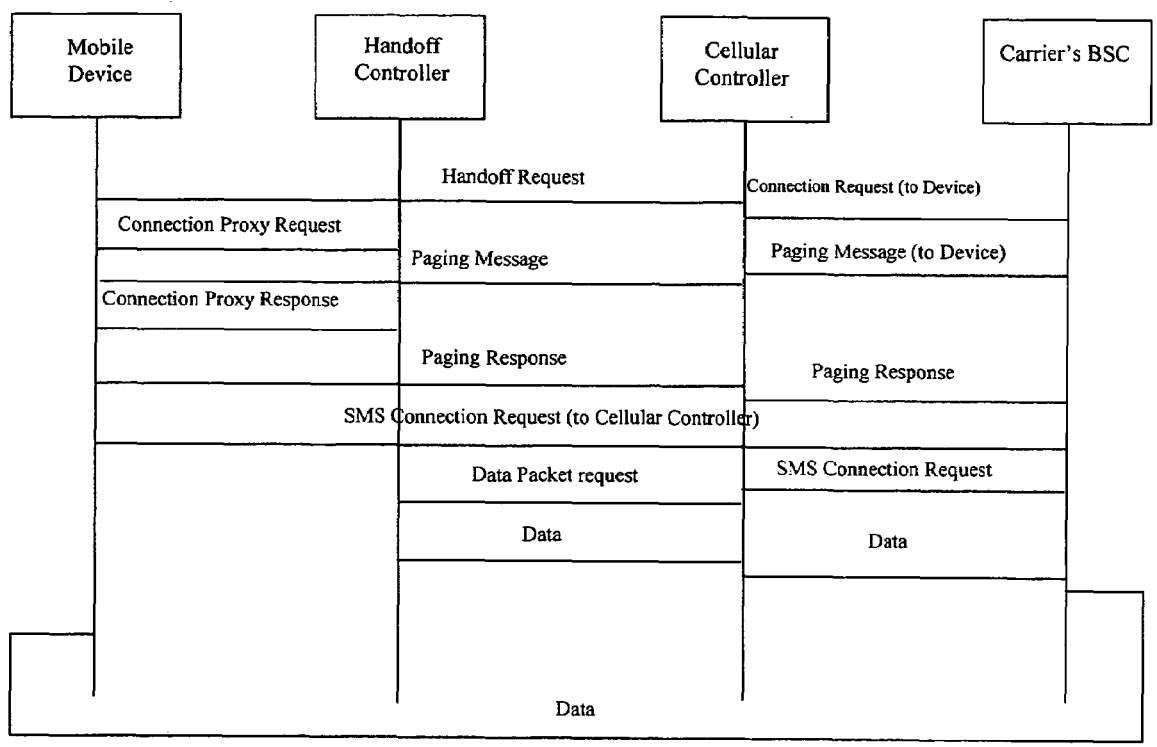

FIG. 3 illustrates the message flow diagram of the handoff procedure. The diagram shows only actions rather than actual messages exchanged.

Data handoff can also be made from the WWAN to the WLAN. The rationale for this is that a mobile device can be supporting a TCP connection when the user roams into a building that has a poor cellular coverage. If the building is an enterprise building that is covered by WLAN, the mobile device will be handed off to the WLAN without disrupting the TCP connection. But if there is good cellular coverage in the building, the policy is not to interrupt the connection; it will be allowed to complete the current process before the device can be registered in the WLAN.

The handoff operation works in the following manner. When the mobile device moves into an enterprise building with poor quality signal reception, which is manifested by the fact that the received signal strength indicator has gone below the predefined threshold, it sends an SMS message to the Cellular Controller with information regarding the channel it is currently on and the TCP connection parameters. The Cellular Controller returns a reply to the message and tunes to the channel. The Cellular Controller returns an SMS acknowledgment to the device and asks the device to commence registration in the WLAN. It then starts buffering the data destined for the device and returning the necessary TCP acknowledgments to the peer process at the other end of the TCP connection on behalf of the device. After the device has registered in the WLAN, it establishes a TCP connection to the Cellular Controller, and the latter will forward the buffered data and all arriving packets to the device over the TCP connection. The Cellular Controller continues to proxy for the device in the WWAN until the mobile device terminates the connection. Since the device is now in the WLAN, the Cellular Controller will continue to proxy for it in the WWAN by listening for data destined for the device and passing these page messages to it over the local TCP connection.

Figure 4:
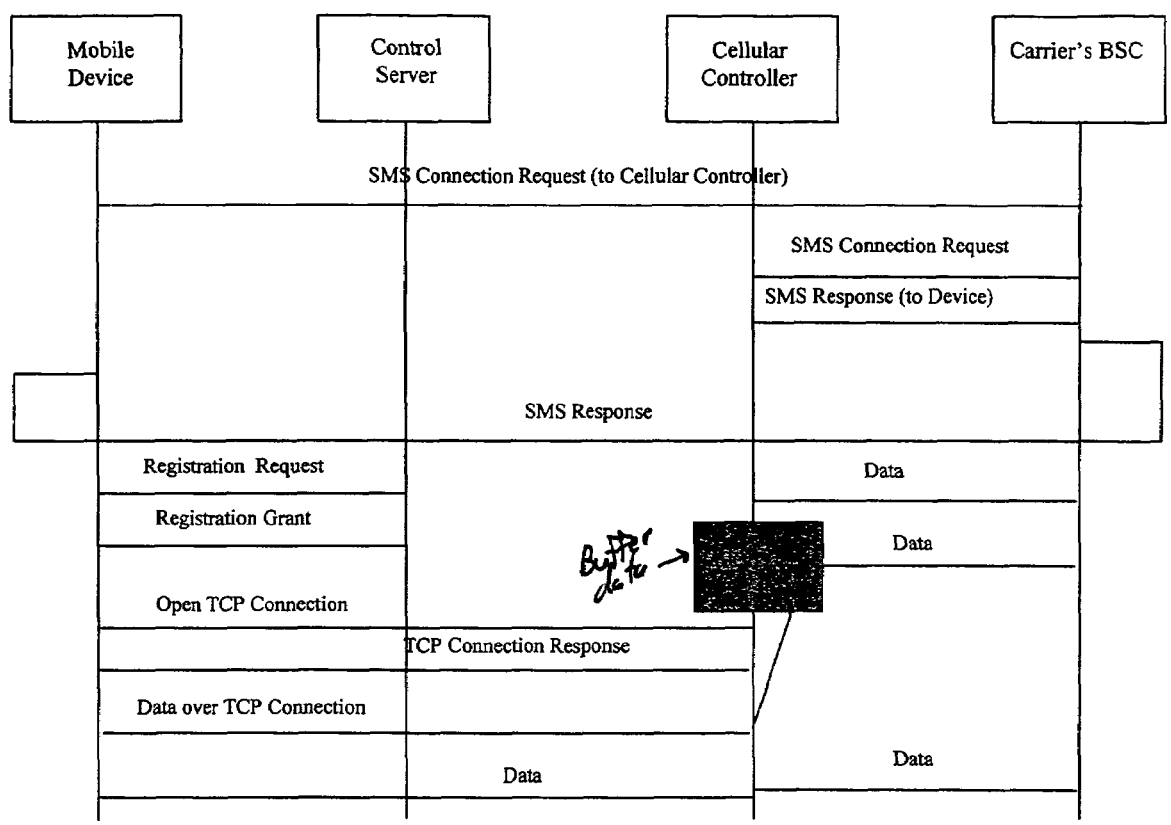
FIG. 4 illustrates the message flow diagram of the handoff procedure from the WWAN to the WLAN, according to the present invention.

FIG. 4 illustrates the message flow diagram of the handoff procedure. The diagram shows only actions rather than actual messages exchanged.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for communicating with a mobile terminal comprising:
   establishing a first data communication path passing from a wide area wireless network through a fixed radio terminal over a local wireless network to the mobile terminal by emulating the mobile terminal on a the wide area wireless network using a the fixed radio terminal; and
   establishing a second data communication path passing from the wide area wireless network directly to the mobile terminal without passing through the fixed radio terminal; and
   switching an active communication session between the first communication path and the second communication path by establishing a third communication path to a controller on the local wireless network, which buffers data to the mobile device during a handoff between the first data communication path and the second data communications path, wherein handing off the active communication session includes successively switching said session between the third communication path and the first communication path and then switching said session between the first communication path and the second communication path.

2. The method of claim 1 wherein the active communication session includes a voice communication session.

3. The method of claim 2 wherein the voice communication session is passed over the local wireless network on the first communication path using a data session.

4. The method of claim 2 wherein the voice communication session is passed over the local network on the first communication path using voice over Internet Protocol.

5. The method of claim 1 wherein switching the active communication session includes switching said session from the first communication path to the second communication path.

6. The method of claim 1 wherein switching the active communication session includes switching said active communication session from the second communication path to the first communication path.

7. The method of claim 1 wherein handing off the active communication session includes successively switching said session between the third communication path and the first communication path and then switching said session between the first communication path and the second communication path.

8. The method of claim 1 further comprising:
   using the fixed radio terminal to emulate each of a plurality of mobile terminals each on a respective different one of a plurality of wide area wireless networks.

9. The method of claim 8 further comprising:
   for each of the plurality of mobile terminals, switching an active communication session between a communication path passing from the respective one of the wide area networks through the fixed radio terminal over the local network to said mobile terminals and a communication path passing from said wide area wireless network directly to said mobile terminal without passing through the fixed radio terminal.

10. A method for handling handing off a communication session with a mobile terminal between a local wireless network and a wide area wireless network comprising:
    switching the communication session between a first communication path extending over the wide area wireless network through a fixed radio terminal and over the local wireless network to the mobile terminal and a temporary communication path passing extending from a controller on the local network to the mobile terminal not passing through fixed radio terminal; and
    switching the communication session between the first communication path and a second communication path extending from the wide area wireless network directly to the mobile terminal without passing through the fixed radio terminal; wherein switching the communication session includes successively switching said session between the temporary communication path and the first communication path and then switching said session between the first communication path and the second communication path;

sending buffered data via the temporary communication path, which was buffered during the switch between the first communications path and the second communication path.

11. A method for handing off a communication session with a mobile terminal between a local wireless network and a wide area wireless network comprising:
   a mobile device sending a registration request to a controller system on a local wireless network;
   the controller system maintaining a wide area wireless network profile for the mobile device;
   the controller system then emulating the mobile device on the wide area wireless network via a fixed radio terminal;
   the controller system monitoring the wide area wireless network for data addressed to the mobile device via the fixed radio terminal and forwarding the data addressed to the mobile device to the mobile device via the local wireless network;
   the mobile device monitoring a signal strength of the local wireless network; in response to mobile device determining that the signal strength of the local wireless network is weak, the mobile device sending an initiate handoff signal to the controller system;
   the controller system passing connection parameters for a wide area cellular network to the mobile device over the local wireless network; the mobile device then switching over to a communication session on the wide area cellular network which does not pass through the fixed radio terminal using the connection parameters; and
   the controller system buffering data until the mobile device signals the ability to receive data over the wide area cellular network, then sending data via the wide area cellular network.

12. A handoff method for a mobile device on a wide area cellular network moving to a local wireless network, the method comprising:
   the mobile device monitoring a signal strength of the wide area cellular network;
   in response to mobile device determining that the signal strength of the wide area cellular network is weak, the mobile device then sending an initiate handoff signal to a controller system including parameters of the data communications session on the wide area cellular network;
   the cellular controller adopting the data communications session on the wide area cellular network for the mobile device by emulating the mobile device on the wide area cellular network and the mobile device registering on the local wireless network; and
   the controller system buffering data received via the data communications session on the wide area cellular network until the mobile device is registered on the local wireless network and the controller system then sending the buffered data to the mobile device over the local wireless network.

* * * * *

UNITED STATES PATENT AND TRADEMARK OFFICE
CERTIFICATE OF CORRECTION

| | | |
|---|---|---|
| PATENT NO. | : 7,356,015 B2 | Page 1 of 1 |
| APPLICATION NO. | : 10/836057 | |
| DATED | : April 8, 2008 | |
| INVENTOR(S) | : Oliver C. Ibe and Steven Blumenthal | |

It is certified that error appears in the above-identified patent and that said Letters Patent is hereby corrected as shown below:

In column 7, claim 1, line 57, change "mobile terminal on a the" to --mobile terminal on the--.

In column 7, claim 1, line 58, change "network using a the" to --network using the--.

In column 8, claim 10, line 47, delete "handling".

In column 8, claim 10, line 54, delete "passing".

In column 8, claim 10, line 56, insert --the-- in front of "fixed radio terminal".

Signed and Sealed this

Twenty-second Day of July, 2008

JON W. DUDAS
*Director of the United States Patent and Trademark Office*